US011953093B2

(12) United States Patent
Engel et al.

(10) Patent No.: US 11,953,093 B2
(45) Date of Patent: Apr. 9, 2024

(54) ACTUATOR, AND DEVICE FOR ENGAGING A PARKING LOCK OF A MOTOR-VEHICLE AUTOMATIC TRANSMISSION HAVING SUCH AN ACTUATOR, AND MOTOR VEHICLE EQUIPPED THEREWITH

(71) Applicant: Küster Holding GmbH, Ehringshausen (DE)

(72) Inventors: René Engel, Asslar (DE); Thomas Schmidt, Ehringshausen (DE)

(73) Assignee: Küster Holding GmbH, Ehringshausen (DE)

( * ) Notice: Subject to any disclaimer, the term of this patent is extended or adjusted under 35 U.S.C. 154(b) by 63 days.

(21) Appl. No.: 17/775,636

(22) PCT Filed: Nov. 10, 2020

(86) PCT No.: PCT/EP2020/081562
§ 371 (c)(1),
(2) Date: May 10, 2022

(87) PCT Pub. No.: WO2021/094275
PCT Pub. Date: May 20, 2021

(65) Prior Publication Data
US 2022/0397193 A1 Dec. 15, 2022

(30) Foreign Application Priority Data

Nov. 11, 2019 (DE) ...................... 10 2019 130 359.1

(51) Int. Cl.
*F16H 63/34* (2006.01)
(52) U.S. Cl.
CPC ..... *F16H 63/3416* (2013.01); *F16H 63/3466* (2013.01)

(58) Field of Classification Search
CPC .. F16H 63/3416; F16H 63/3466; F16H 21/44; F16H 61/36; F16H 2061/2892; F16H 61/32
See application file for complete search history.

(56) References Cited

U.S. PATENT DOCUMENTS 6,244,394 B1 * 6/2001 Gutierrez ................ B60T 7/107
188/162
7,490,699 B2 * 2/2009 Gil .......................... B60T 7/107
188/1.11 R
(Continued)

FOREIGN PATENT DOCUMENTS

DE 10045953 A1 5/2002
DE 102011014815 A1 10/2011
(Continued)

*Primary Examiner* — Jacob S. Scott
*Assistant Examiner* — Farhana Pervin
(74) *Attorney, Agent, or Firm* — Rogowski Law LLC

(57) ABSTRACT

The invention relates to an actuator having a drive device which drives a drive shaft, a first actuating element which is operatively connected to the drive shaft, a spring element which can be supported on one side on a housing component of the actuator and is supported on the other side on a second actuating element which is configured for stressing the spring element, wherein a rotational element which can be driven by means of the drive shaft and is rotatably mounted is provided. According to the invention, a further actuating element for actuating a switching device is provided, which further actuating element is operatively connected to the first actuating element, and a transmission device with a transmission element is provided between the first actuating element and the actuating element of the switching device.

18 Claims, 6 Drawing Sheets

(56) References Cited

U.S. PATENT DOCUMENTS

| | | | |
|---|---|---|---|
| 2006/0092574 A1* | 5/2006 | Oh | G11B 5/5552 |
| 2009/0120222 A1* | 5/2009 | Kimura | F16H 61/32 |
| | | | 74/335 |
| 2011/0146439 A1* | 6/2011 | Saitner | F16H 63/3491 |
| | | | 74/473.25 |
| 2017/0175888 A1 | 6/2017 | Jeon | |
| 2017/0307080 A1 | 10/2017 | Bormann | |
| 2018/0195603 A1* | 7/2018 | Nava Gonzalez | F16H 61/32 |
| 2019/0107197 A1* | 4/2019 | Pezzotta | F16H 63/3466 |
| 2019/0383392 A1 | 12/2019 | Spratte | |
| 2020/0116258 A1* | 4/2020 | Cyrén | F16H 19/04 |
| 2020/0166132 A1* | 5/2020 | Kwon | F16H 63/3433 |
| 2021/0332881 A1* | 10/2021 | Nakao | F16H 63/3466 |

FOREIGN PATENT DOCUMENTS

| | | | |
|---|---|---|---|
| DE | 102014219037 A1 | 3/2016 | |
| DE | 102016224660 A1 | 6/2018 | |
| DE | 102017218638 A1 | 4/2019 | |
| EP | 3181957 A1 | 6/2017 | |
| EP | 3545216 A1 | 10/2019 | |
| WO | WO-2017182555 A1 * | 10/2017 | F16H 25/18 |

\* cited by examiner

ACTUATOR, AND DEVICE FOR ENGAGING A PARKING LOCK OF A MOTOR-VEHICLE AUTOMATIC TRANSMISSION HAVING SUCH AN ACTUATOR, AND MOTOR VEHICLE EQUIPPED THEREWITH

CROSS-REFERENCE TO RELATED APPLICATIONS

This application is a national stage application (under 35 USC § 371) of PCT/EP2020/081562, filed Nov. 10, 2020, which claims benefit of DE 102019130359.1, filed Nov. 11, 2019, the contents of each of which is incorporated by reference herein.

BACKGROUND OF THE INVENTION

Technical Field and State of the Art

The invention relates to an actuator and to a device for activating a parking lock of a motor-vehicle automatic transmission.

The use of automatic shift activations or shift-by-wire systems in motor vehicles offers certain advantages as compared to mechanically coupled shift activations. Thus, for example, the shifting steps of the transmission can be selected flexibly and by software, depending on the condition of the vehicle. The activating of the parking lock by engaging the P-gear is also no longer done manually by the driver here, but rather is automatically assured by the control software, for example when stopping or leaving the vehicle. Since an engaging of the P-gear for activating the parking lock before leaving the motor vehicle is absolutely necessary for safety reasons, such systems and actuators possess emergency mechanisms which are supposed to assure an engaging of the P-gear even in the event of faults of the actuator or a power outage.

These emergency mechanisms typically work with energy accumulators, such as, for example, mechanical spring elements, which assure, for instance, the engaging of a mechanical emergency position independently of the actuator.

An actuator according to the preamble of patent claim 1 is known from DE 10 2011 014 815 A1. In this, a motor vehicle parking lock actuator having at least one spindle is described, wherein a longitudinal movement is realized from a rotational movement of an engine for the automatic shifting of a transmission gear. The emergency function for engaging the parking lock is realized in this case by a spring element, which is prestressed by the activating of the non-parking position of the actuator and which is held mechanically by a catch mechanism. A shift function to trigger the emergency mechanism for engaging the P-gear is to be done by a voltage source independent of the actuator. The drawback with this actuator, however, is that an independent voltage source is needed to trigger the emergency mechanism. Therefore, the P-gear cannot be engaged when the independent voltage source also is not available, which may occur in particular if the storage battery of the motor vehicle is discharged and no other voltage source is available either, such as, for example, a properly functioning generator.

Furthermore, in the actuator of DE 10 2011 014 815 A1 it is necessary to leave the P-gear for the prestressing of the spring element, which produces an unwanted and unsafe vehicle situation because the P-gear of the transmission is left, even though the emergency mechanism is not yet available.

A parking lock device is known from DE 100 45 953 B4, intended in particular for a motor vehicle provided with an automatically controllable transmission. The parking lock device comprises an activating device, encompassing an actuating element for activating a parking lock, a spring accumulator for activating the parking lock, a controllable actuating drive for deactivating the parking lock, and a locking device for arresting the parking lock in the deactivated condition. The actuating drive has an electromechanical design and is connected to a main activating lever. The spring accumulator, the actuating drive, and the locking device can be connected or operatively connected via the main activating lever to the actuating element.

It is therefore an object of the invention to modify an actuator such that it is assured, in all situations, in particular upon loss of the voltage supply, that an actuating element for activating a shifting device of the actuator is automatically returned to its starting position. Moreover, it is an object of the invention to provide a device for engaging or disengaging a parking lock of a motor-vehicle automatic transmission having such an actuator as well as an improved motor vehicle.

Furthermore, it is an object of the invention that the actuator or the device can be used in a variety of motor vehicles having different automatic transmissions and/or of different manufacturers.

SUMMARY OF THE INVENTION

The actuator according to the invention comprises here a drive device which drives a drive shaft, a first actuating element which is operatively connected to the drive shaft for actuating a switching device, and a spring element, wherein the spring element can be supported on one side on a housing component of the actuator and is supported on the other side on a second actuating element which is configured for stressing the spring element, wherein a rotational element is provided, which can be driven by means of the drive shaft and which is rotatably mounted.

Now, the invention is characterized in that a further actuating element for actuating the switching device is provided, which further actuating element is operatively connected to the first actuating element, and a transmission device with a transmission element is provided between the first actuating element and the actuating element of the switching device.

For engaging and disengaging the parking lock of a motor-vehicle automatic transmission, a so-called displacement path is required. This displacement path depends on the transmission variant and/or the vehicle manufacturer, so that many different displacement paths exist for engaging and disengaging the parking lock. The required displacement path may differ by a factor of three to four among different manufacturers.

According to the invention, thanks to the transmission device with transmission element, it is possible to achieve a relatively larger displacement path as compared to known actuators, so that the actuator according to the invention and the device according to the invention can be used for a variety of transmission variants and/or vehicle manufacturers, without carrying out special adaptations to the different displacement paths in the actuator itself.

Moreover, the invention is characterized in that a rotational element is provided, being rotatably mounted and drivable by means of the drive shaft. This rotational element can be configured on the one hand with a first control cam, operatively connected to the first actuating element, and on the other hand with a second control cam for stressing the spring element.

The spring element here has the function of engaging the P-gear in the event of a fault in the actuator or a voltage outage. For this, the spring element is also operatively connectable by means of the second actuating element to the first actuating element, so that the first actuating element can be brought back to the P-gear along the first control cam thanks to the restoring force applied by the prestressing of the spring element. In particular, the second actuating element can be configured as a driver for the first actuating element.

In order to leave the P-gear and engage the various shift gears, for example R, N, D, the rotational element can be turned by means of the drive device and the drive shaft so that the first control cam can move the first actuating element by virtue of the operative contact with the first control cam. A switching device, connecting the actuator and the automatic transmission, for example with a shift cable pull, is designed to pass on the movement generated at the actuator to the automatic transmission, so that the P-gear can be left and various shift gears, for example R, N, D, can be engaged.

For this, the first control cam can have different gradients for the shifting movement or the engaging of the shift gears. The gradient of the control cam can be designed, for example, so that sufficient actuating force can be generated under all circumstances for the disengaging of the parking lock by means of the actuator or an emergency adjustment device. The actuating force here is basically composed of the minimum adjustment force required in the transmission for engaging different shift gears and possibly the restoring force of the spring element, against which the actuator works already upon leaving the P-gear. For example, such an actuating force may amount to around 500 N. In the event of an emergency operation, conversely, the rotational element and the engine are turned in reverse by the gradient of the first control cam in interaction with the first and second actuating elements of the actuator under the influence of the spring force applied by the spring element.

The device according to the invention for engaging a parking lock in an automatic transmission of a motor vehicle comprises here such an actuator according to the invention, in particular a parking lock actuator.

Thanks to the use of an actuator according to the invention in a device for engaging a parking lock in an automatic transmission of a motor vehicle, it is now assured that the spring element can always be prestressed before leaving the P-gear of the automatic transmission of the motor vehicle. Namely, by means of the second control cam and the second engaging element of the second actuating element, it is now possible to prestress the spring element without changing the position of the first actuating element. In this way, it becomes possible to prestress the spring element while the first actuating element, when using such an actuator in a motor vehicle having an automatic transmission, is in such a position that the automatic transmission of the motor vehicle is engaged in the P-gear.

The rotational element can be limited in the range of its rotary movement between a maximum negative and a maximum positive rotational position thanks to the configuration of the first and/or the second control cam, so that for example a half-rotation is possible in a respective direction of turning, i.e., around +180° or −180°.

According to a first advantageous embodiment of the invention, the form of the transmission element is asymmetrical at least on one side. For example, it can be provided that the transmission element has an unequal shape. In this way, the transmission ratio of the transmission element can be varied, for example, at the start of a movement there can be transmitted a larger force than the force of the spring element, and then a larger displacement path can be provided in the further course. This is in particular conceivable for the disengaging of the P-gear and the shifting of the switching device to the R-gear. Accordingly, the ratio changes at the time of the actuating, since a large force is no longer needed in the further course of the displacement movement, but on the other hand a longer displacement path is needed. With the transmission ratio, the required force can be produced in the necessary region.

In one modification of the invention, the transmission element is configured as a lever, in particular as a cranked lever or angled lever. This variant of the transmission element is a configuration which is particularly easy to produce. With the angled lever, the linear spring force can be converted into a nonlinear spring force.

According to another variant of the invention, the lever is configured in multiple parts, preferably as a rigid unit.

Basically, a distinction is made between one-sided and two-sided levers, depending on whether the forces are acting only on one side or on both sides of the fulcrum of the lever. Moreover, besides the straight lever, there is also still the bent lever or angled lever.

In the case of two-sided levers, the points of application of the forces, looking from the axis of rotation, lie on different sides of the lever. On a one-sided lever, the axis of rotation lies at the edge of the lever arm, so that the points of attack of all active forces, looking from the axis of rotation, lie on the same side of the lever. A lever with an angled arm is called an angled lever. Depending on where the axis of rotation is located, an angled lever is equivalent to a one-sided or two-sided lever.

For a particularly simple transmission of the force or the displacement path for the engaging or disengaging of a parking lock, the transmission element is received on the first actuating element and/or on the actuating element of the switching device.

In the event that the transmission element is a lever, for example an angled lever, one lever arm can be received on the first actuating element and the other lever arm on the actuating element of the switching device, so that the transmission is realized in an easy manner. The lever is accordingly arranged at two linking points.

According to one development, the transmission element is mounted rotatably about at least one axis of rotation, wherein the axis of rotation is arranged in particular between a linking point of the transmission element on the first actuating element and a linking point of the transmission element on the further actuating element of the switching device. In this way, a pressing force is transmitted to engage the parking lock.

Alternatively, it can also be provided that the at least one axis of rotation coincides with at least one linking point or that the at least one axis of rotation lies outside the region between the linking points. For the second situation where the axis of rotation lies outside the region between the linking points, a pull force is transmitted to disengage the parking lock. In this way, at the start of the movement, a relatively larger force is exerted on the transmission element in order to emerge from the parking lock. A larger displacement path is then provided in the further course of the movement. Thanks to the transmission, the required force can be produced in the necessary region.

As mentioned, the lever may be of single-piece or two-piece design. If the lever is two-piece, it would turn about the axis of rotation (situated on the outside).

According to another advantageous embodiment of the invention, the axis of rotation is provided at one end of the actuating element.

Another advantageous embodiment of the invention provides for the transmission element to be arranged inside a housing of the actuator.

According to one alternative embodiment of the actuator, the at least one transmission element can be configured as a gear pairing, preferably one that is eccentrically arranged. In particular, it is conceivable that the toothed racks for the gears of the gear pairing are arranged on the further actuating element for actuating the switching device and the first actuating element. This configuration ensures an actuating in the pulling direction.

In another advantageous embodiment of the invention, it is provided that the transmission element is configured as a multiple linkage, in particular as a trapezoidally arranged four-bar linkage.

Moreover, it can be provided that, upon a turning of the rotational element from 0° in the direction of the maximum positive angle position, for example up to 180°, different shifting gears of such a switching device can be engaged by means of the first control cam and the first engagement element of the first actuating element. In this way, it becomes possible for different shifting gears of an automatic transmission to be able to be engaged without at the same time having to stress the spring element, since this prestressing of the spring element already occurs by the above-described turning of the rotational element to its maximum negative rotary position, for example from 0° to −180°. In order that this prestressing is preserved when the rotational element turns back from its maximum angle position, for example at −180°, to 0°, advantageously a holding device is provided, in particular an electrical holding magnet device, with which the stressed spring element, which is stressed while building up a restoring force, is held in its position. Thus, a stressing of the spring element during the engaging of different shift gears from the P-gear is not required, since this has already been done in advance.

In order to provide a particularly simple structural design for the rotational element, it has proven to be expedient for the rotational element to be configured as a circular disk, on which the two control cams are arranged respectively on one of the opposite surfaces of the circular disk. Accordingly, the control cams can be arranged with no problem by means of the corresponding engagement elements, without having to take into account perturbing influences of the respectively other control cam or the engagement element corresponding thereto.

If the spring element does not need to be prestressed once upon emerging from the P-gear, the first control cam is configured such that the spring element is stressed while building up a restoring force upon turning of the rotational element from its angle position 0° to its maximum positive angle position of up to +180°. In particular, the prestressing of the spring element occurs here directly after leaving the P-gear, so that the restoring force of the spring element immediately made available is sufficient to return the first actuating element back to the P-gear.

Furthermore, it has proven to be advantageous here for a worm to be arranged on the drive shaft, by which a gear arrangement can be driven, which in turn drives the rotational element. The rotational element itself can be here part of this gear arrangement, wherein it is also possible for the gear arrangement to also consist of only one gear.

Alternatively, of course, it is also conceivable for the gear arrangement to consist of multiple gears, operatively connected to each other, wherein one gear is then configured as a circular disk, having the corresponding control cams on its opposite surfaces.

A device for the engaging of a parking lock of a motor-vehicle automatic transmission having a previously described actuator, in particular a parking lock actuator, is also to be independently protected.

Furthermore, a motor vehicle is also to be protected independently by means of such a device, wherein the motor vehicle comprises an automatic transmission and an above-described device for engaging a parking lock of the automatic transmission.

Further goals, advantages, features and application possibilities of the present invention will emerge from the following description of an exemplary embodiment with the aid of the drawing. All of the features described and/or depicted here constitute the subject matter of the present invention in themselves or in any meaningful combination, even regardless of being brought together in the claims or being referred back to the claims.

DESCRIPTION OF THE DRAWINGS

There are shown here, in part schematically.

DETAILED DESCRIPTION

Figure 1:
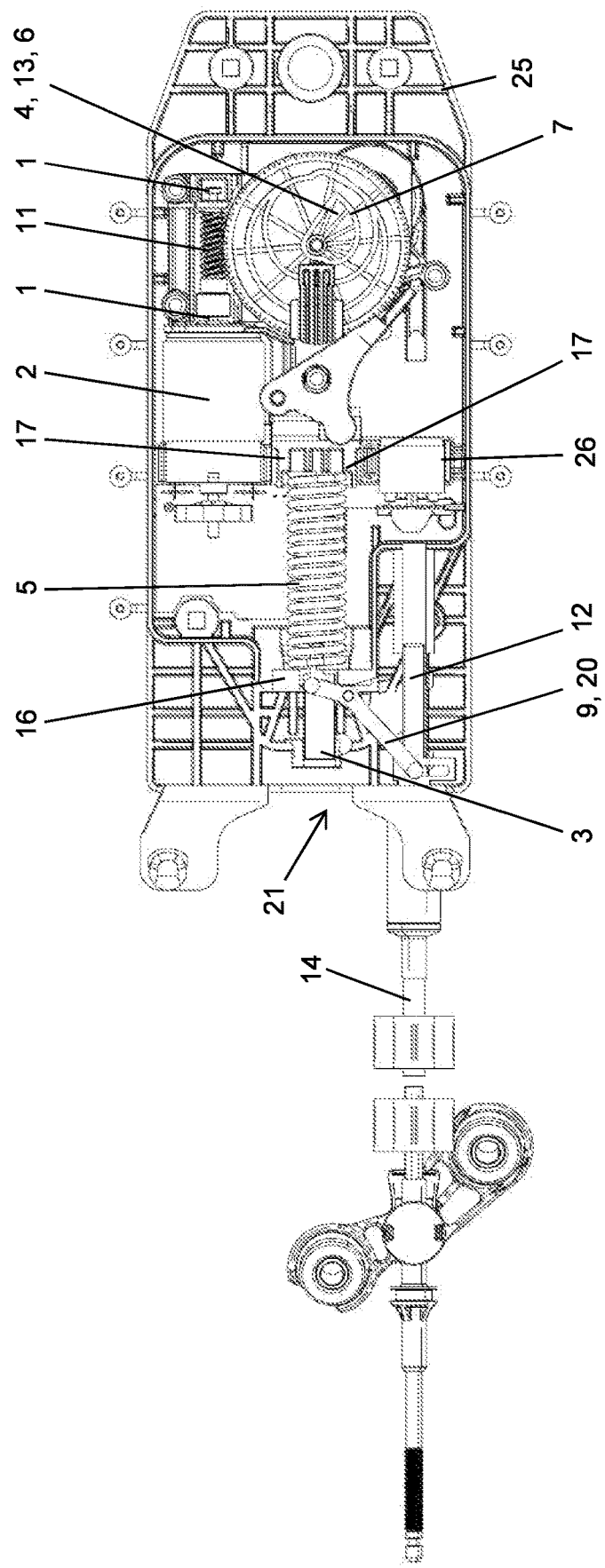
FIG. 1 a first exemplary embodiment of an actuator according to the invention with a transmission element in a first position, FIG. 2 the actuator of FIG. 1 with transmission element in a second position, FIG. 3 a detail view of a cutout portion of the actuator with transmission element of FIGS. 1 and 2, FIG. 4 a second exemplary embodiment of the actuator with transmission element in a first position, FIG. 5 the actuator of FIG. 4 with transmission element in a second position, FIG. 6 a detail view of a cutout portion of the actuator with transmission element of FIGS. 4 and 5 and The same or equivalent components are provided with reference numbers in the figures of the drawing represented below with the aid of one embodiment in order to improve the readability.
Figure 2:
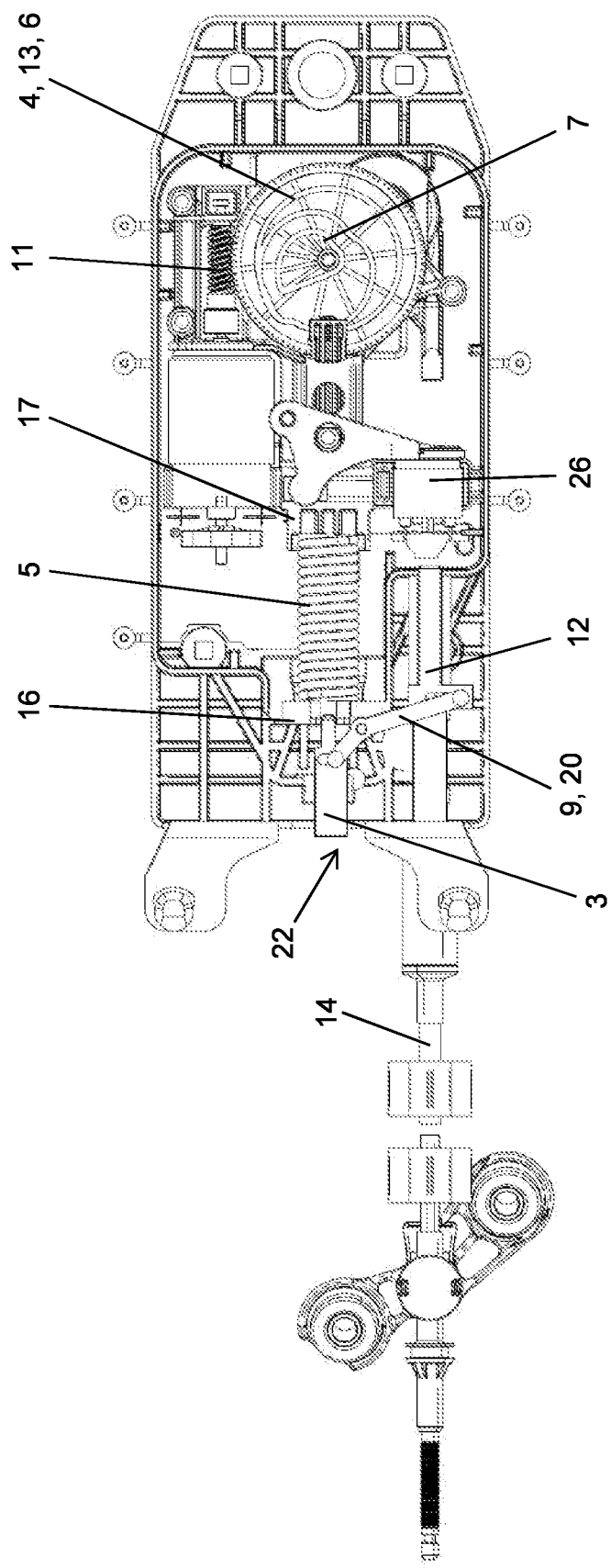
Figure 4:
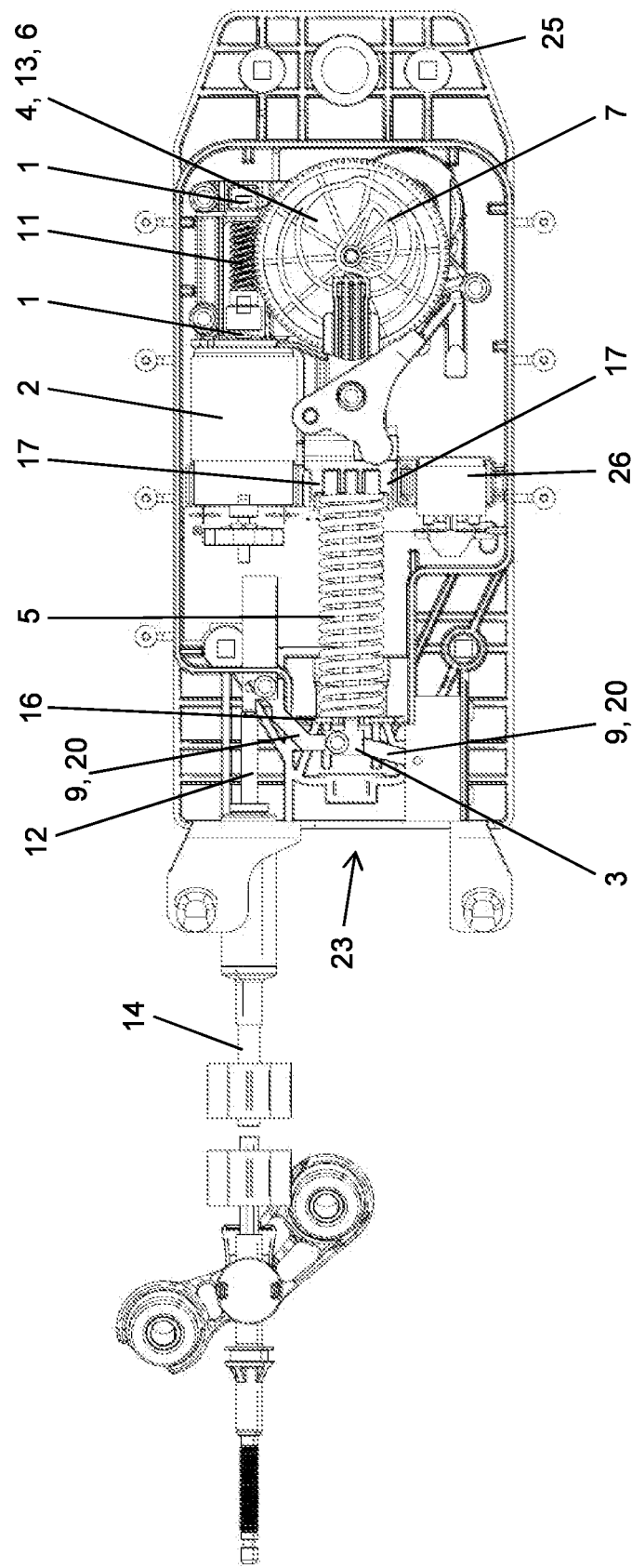
Figure 5:
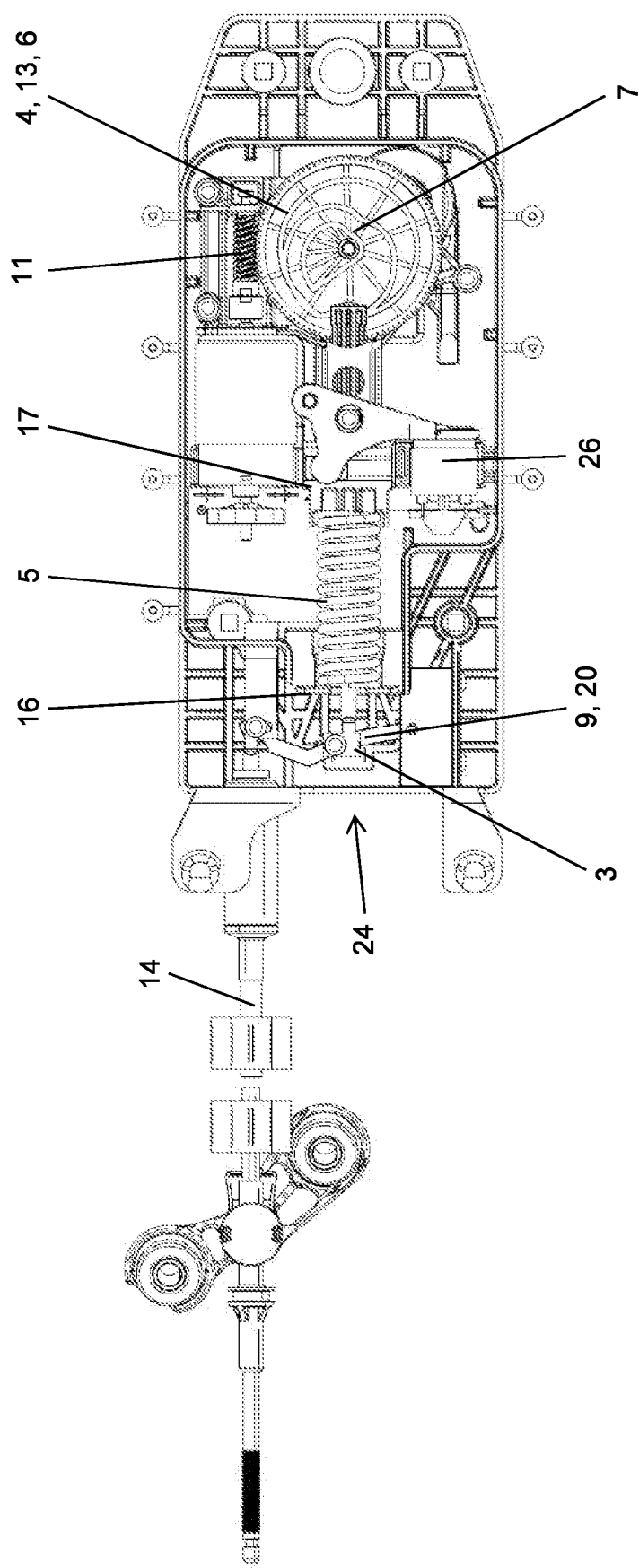

FIG. 1 as well as FIGS. 2, 4 and 5 show an actuator according to the invention, which is arranged in a housing, arranged on the housing plate 25 and covered with a housing lid (not shown). There can also be seen in this representation a cable pull 14, by means of which different shift gears of an automatic transmission of a motor vehicle can be engaged. The cable pull 14 here is operatively connected to a first actuating element 3 for activating the switching device of the motor-vehicle automatic transmission of the motor vehicle.

Moreover, there is clearly seen according to FIGS. 1, 2, 4 and 5 a rotational element 4, which is configured as a gear 13 and is furthermore configured as a circular disk 6. The rotational element 4 is mounted here rotatably at its midpoint, and in the present exemplary embodiment comprises a control cam 7. It can also be provided that the rotational element 4 has two different control cams on its opposite surfaces. The gear 13, which can also be part of a gear arrangement, meshes in the present case with a worm 11 of a drive shaft 1 of a drive device 2.

The actuator may be situated in one position corresponding to the position of the P-gear of an automatic transmission of a motor vehicle and the neutral angle position 0° of the rotational element 4. An engagement element of the first actuating element 3 is in engagement with the control cam 7 in an operatively connected manner. If, now, the rotational element 4 configured as a gear 13 is rotated by means of the drive device 2, the drive shaft 1 and the worm 11, the actuating element 3 by virtue of the engaging of the engagement element into the control cam 7 is moved in the direction of the housing component 16, so that by means of the switching device of the automatic transmission which is activated by the cable pull 14 and not shown here in greater detail this is moved in or out from its P-gear, and different shift gears can be engaged, for example R, N, D. The rotational element 4 here is limited in its rotary movement by virtue of the control cam 7, so that a rotation about, for example, +180° or another value is possible.

During the operation of a motor vehicle, the spring element 5 after having been prestressed can be held in the prestressed position with the aid of an electrical holding magnet device 26. In other words, the prestressing of the spring element 5 is maintained here in its stress position during the rotation of the rotational element 4 with the aid of the holding magnet device 26.

As emerges from FIGS. 1 to 6, the actuator comprises a further actuating element 12 for activating the switching device, being operatively connected to the first actuating element 3. A transmission device 8 with a transmission element 9 is provided between the first actuating element 3 and the actuating element 12 of the switching device.

For the engaging and disengaging of the parking lock of a motor-vehicle automatic transmission, a so-called displacement path is required. This displacement path depends on the transmission variant and/or the vehicle manufacturer, so that many different displacement paths exist for the engaging and disengaging of the parking lock. Thanks to the transmission device 8 according to the invention with transmission element 9, it is possible to achieve a relatively larger displacement path as compared to known actuators, so that the actuator according to the invention and the device according to the invention can be used for a variety of transmission variants and/or vehicle manufacturers, without carrying out special adaptations to the different displacement paths.

According to the present embodiments, the form of the transmission element is asymmetrical at least on one side. For example, it can be provided that the transmission element has an unequal shape.

In this way, the transmission ratio of the transmission element can be varied, for example, at the start of a movement there can be transmitted a larger force than the spring, and a larger displacement path can be provided in the further course. This is in particular conceivable for the disengaging of the P-gear and the shifting of the switching device to the R-gear. Accordingly, the ratio changes, since a large force is no longer needed in the further course of the displacement movement, but on the other hand more displacement path is needed.

According to FIGS. 1 to 6, the transmission element 9 is configured as a lever 20, in particular as a cranked lever or angled lever, wherein the linear spring force is converted into a nonlinear spring force. For a particularly simple transmission of the force or the displacement path for the engaging or disengaging of a parking lock, the transmission element 9 is received on the first actuating element 3 and/or on the actuating element 12 of the switching device.

In the case of two-sided levers, the points of application of the forces, looking from the axis of rotation, lie on different sides of the lever. On a one-sided lever, the axis of rotation lies at the edge of the lever arm, so that the points of application of all active forces, looking from the axis of rotation, lie on the same side of the lever. A lever with an angled arm is called an angled lever. Depending on where the axis of rotation is located, an angled lever is equivalent to a one-sided or two-sided lever.

As can be seen in FIGS. 1 to 6, one lever arm of the lever 20 can be received on the first actuating element 3 and the other lever arm on the actuating element 12 of the switching device, so that the transmission is realized in an easy manner. The lever 20 is accordingly arranged at two linking points 18, 19.

In the present case, the transmission element 9 is mounted rotatably about at least one axis of rotation 10.

Figure 3:
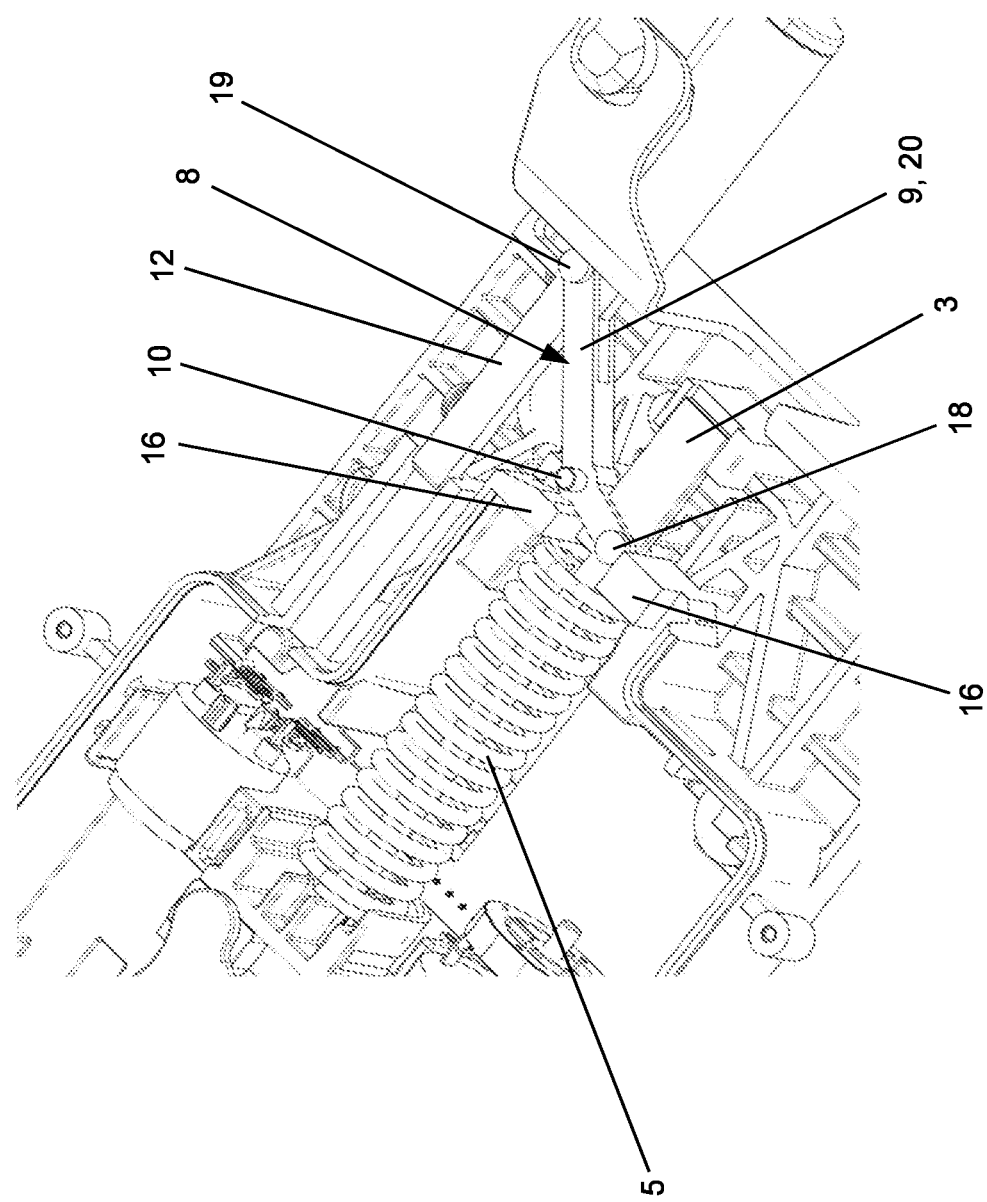
Figure 6:
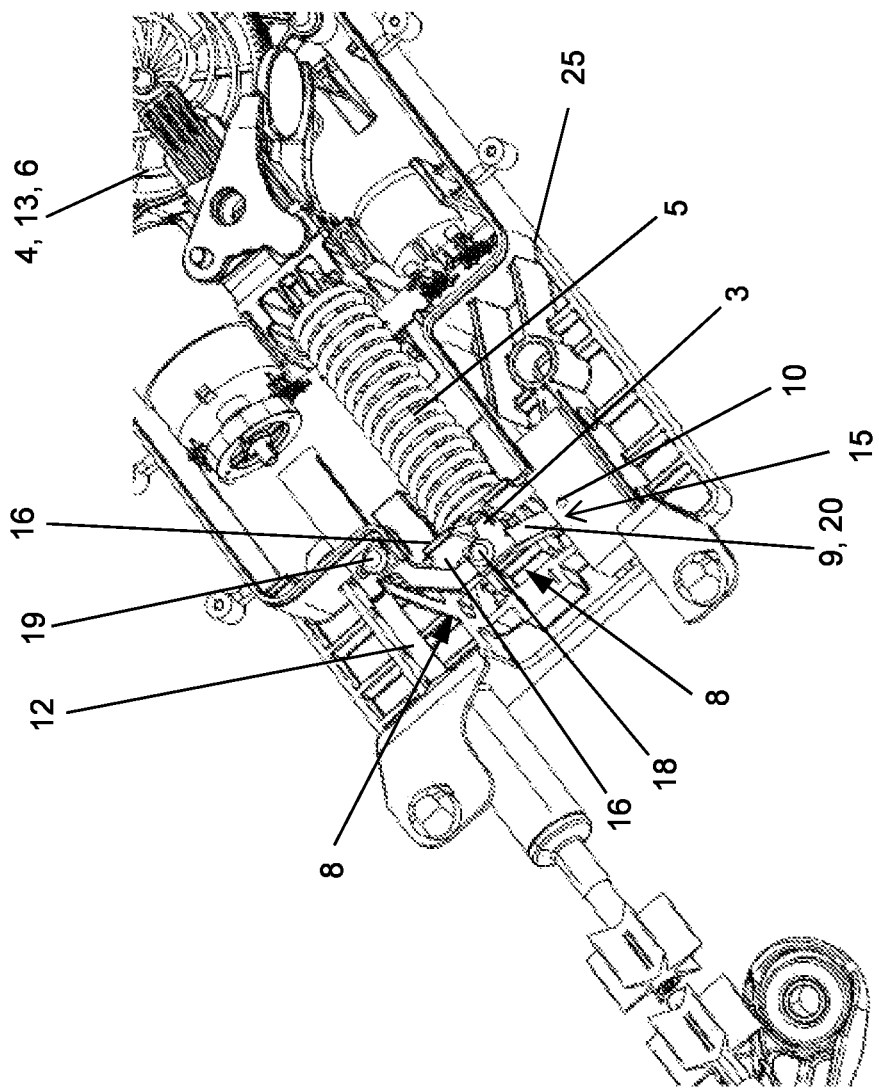

The embodiment of the actuator of FIGS. 1 to 3 differs from that of FIGS. 4 to 6 by the transmission element 9 configured as the lever 20.

FIG. 1 shows the actuator with a transmission element 9, wherein the axis of rotation 10 of the transmission element 9 is arranged between a linking point 18 of the transmission element 9 on the first actuating element 3 and a linking point 19 of the transmission element 9 on the further actuating element 12 of the switching device. In this way, a pressing force is transmitted for the engaging of the parking lock.

According to FIG. 1, the spring element 5 is shown in a relaxed, first position 21 and in FIG. 2 it is shown in a stressed, second position 22, wherein the parking lock is engaged in this position and a prestressing of the spring element 5 is maintained, for example, with the aid of the above-mentioned holding magnet device 26.

During the movement of the transmission element 9 and thus of the first actuating element 3 and of the further actuating element 12 of the switching device, there is action on the cable pull 14 such that the parking lock is engaged by a pressing or thrusting movement of the cable pull 14.

FIG. 3 shows a detail view of the transmission element 9 in the position of FIG. 1.

Alternatively, it can also be provided that the at least one axis of rotation coincides with at least one linking point 18, 19. According to FIGS. 4 to 6, the at least one axis of rotation 10 of the transmission element 9 lies outside the region between the linking points 18, 19, so that a pulling force is transmitted for the disengaging of the parking lock. In this way, at the start of the movement, a relatively larger force is exerted on the transmission element in order to emerge from the parking lock. A comparatively larger displacement path is then provided in the further course of the movement.

According to FIG. 4, a first position 23 of the transmission element 9 is represented. Here, the parking lock is disengaged, and the spring element 5 is relaxed. The holding magnet device 26 is open, so that no prestressing of the spring element 5 is maintained with the aid of the holding magnet device 26.

In the second position 24 of the actuator of FIG. 5, the spring is stressed and a prestressing of the spring element 5 is maintained with the aid of the holding magnet device 26. By contrast with the embodiment of FIGS. 1 to 3, a pulling movement now occurs, instead of a pressing or thrusting movement.

According to the embodiment corresponding to FIGS. 4 to 6, the axis of rotation is provided at one end of the actuating element. Moreover, it can be provided that the transmission element 9, in particular the lever 20, is configured in multiple parts, but still forms a rigid unit.

In the present case, the transmission element 9 is arranged inside a housing of the actuator.

According to an alternative embodiment (not shown) of the actuator, the at least one transmission element 9 can be configured as a gear pairing, preferably arranged eccentrically. In particular, it is conceivable that the toothed racks for the gears of the gear pairing are arranged on the further actuating element 12 for actuating the switching device and the first actuating element 3.

In another advantageous embodiment (not shown) of the invention, it is provided that the transmission element 9 is configured as a multiple linkage, in particular as a trapezoidally arranged four-bar linkage.

In FIG. 1, but also in FIGS. 2, 4 and 5, the first actuating element 3 is again seen, being provided on the one hand with a first engagement element 20 which engages in the control cam 7 for engagement purposes and on the other hand is connected to the cable pull 14 of a switching device of the automatic transmission of the motor vehicle.

The first actuating element 3 here is mounted movably in a second actuating element 17, which on the one hand is provided with a second engagement element for engaging in the second control cam (not shown) and on the other hand is supported on the spring element 5.

Moreover, FIGS. 1 to 6 also show the housing plate 25, on which the actuator is arranged. Moreover, it will be noticed in the representation of FIGS. 1 to 6 that the spring element 5 is supported on the one hand on a housing component 16 of the actuator and on the other hand on the actuating element 17.

LIST OF REFERENCE NUMBERS

1 Drive shaft
2 Drive device
3 Actuating element
4 Rotational element
5 Spring element
6 Circular disk
7 Control cam
8 Transmission device
9 Transmission element
10 Axis of rotation of the transmission element
11 Worm
12 Further actuating element
13 Gear
14 Cable pull
15 End of the transmission element
16 Housing component
17 Actuating element
18 Linking point
19 Linking point
20 Lever
21 First position
22 Second position
23 First position
24 Second position
25 Housing plate
26 Holding magnet device

The invention claimed is:

1. An actuator, comprising:
a drive device (2) which drives a drive shaft (1),
a first actuating element (3) operatively connected to the drive shaft (1),
a spring element (5) supported on one side on a housing component (16) of the actuator and on an opposite side on a second actuating element (17) configured for tensioning the spring element (5),
a rotational element (4) adapted to be driven by the drive shaft (1) and which is rotatably mounted, wherein the rotational element (4) has a first control cam (7), which is operatively connected to the first actuating element (3) and a second control cam, in which the second actuating element (17) engages for tensioning the spring element (5),
a further actuating element (12) for actuating a switching device, which further actuating element is operatively connected to the first actuating element (3), and a transmission device (8) with a transmission element (9) between the first actuating element (3) and the further actuating element (12) of the switching device.

2. The actuator as claimed in claim 1, wherein the transmission element (9) is asymmetrical at least on one side.

3. The actuator as claimed in claim 1, wherein the transmission element (9) is configured as a lever (20), which may be a cranked lever or an angled lever.

4. The actuator as claimed in claim 3, wherein the lever (20) is configured in multiple parts.

5. The actuator as claimed in claim 1, wherein the transmission element (9) is received on the first actuating element (3) and/or on the further actuating element (12) of the switching device.

6. The actuator as claimed in claim 1, wherein the transmission element (9) is mounted rotatably about an axis of rotation (10), and wherein the axis of rotation (10) is arranged between a linking point (18) of the transmission element (9) on the first actuating element (3) and a linking point (19) of the transmission element (9) on the further actuating element (12) of the switching device.

7. The actuator as claimed in claim 6, wherein the axis of rotation (10) coincides with at least one linking point (18, 19), or wherein the axis of rotation (10) lies outside the region between the linking points (18, 19).

8. The actuator as claimed in claim 6, wherein the axis of rotation (10) is provided at one end (15) of the transmission element (9).

9. The actuator as claimed in claim 1, wherein the transmission element (9) is arranged inside a housing of the actuator.

10. The actuator as claimed in claim 1, wherein the at least one transmission element (9) is configured as a gear pairing that can be arranged eccentrically.

11. The actuator as claimed in claim 10, wherein the gear pairing has gears with toothed racks, and wherein are arranged on the further actuating element (12) for actuating the switching device and the first actuating element (3).

12. The actuator as claimed in claim 1, wherein the transmission element (9) is configured as a multiple linkage.

13. The actuator as claimed in claim 1, wherein a worm (11) is arranged on the drive shaft (1), by way of which drives the rotational element (4) across a gear arrangement (12).

14. A device for engaging a parking lock of a motor-vehicle automatic transmission having an actuator as claimed in claim 1.

15. A motor vehicle having an automatic transmission and a device as claimed in claim 14 interacting with said automatic transmission.

16. The actuator as claimed in claim 1, wherein the lever (20) is configured in multiple parts as a rigid unit.

17. The actuator as claimed in claim 12, wherein the multiple linkage is a trapezoidally arranged four bar linkage.

18. A device for engaging a parking lock of a motor-vehicle automatic transmission, comprising:
- an actuator comprising a drive device configured to drive a drive shaft, a first actuating element operatively connected to the drive shaft, a spring supported on one side on a housing of the actuator and on an opposite side on a second actuating element configured for tensioning the spring, a rotational element mounted for rotation and adapted to be driven by the drive shaft, wherein the rotational element has a first control cam which is operatively connected to the first actuating element and a second control cam in which the second actuating element engages for tensioning the spring, a further actuating element configured for actuating a switching device, said further actuating element operatively connected to the first actuating element, and
- a transmission device with a lever between the first actuating element and the further actuating element of the switching device.

* * * * *